United States Patent
Butler et al.

(10) Patent No.: US 10,649,973 B2
(45) Date of Patent: May 12, 2020

(54) METHOD FOR PERFORMING IN-DATABASE DISTRIBUTED ADVANCED PREDICTIVE ANALYTICS MODELING VIA COMMON QUERIES

(71) Applicant: Tibco Software Inc., Palo Alto, CA (US)

(72) Inventors: George R. Butler, Tulsa, OK (US); Thomas Hill, Tulsa, OK (US); Vladimir S. Rastunkov, Tulsa, OK (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 370 days.

(21) Appl. No.: 14/826,770

(22) Filed: Aug. 14, 2015

(65) Prior Publication Data

US 2017/0046344 A1   Feb. 16, 2017

(51) Int. Cl.
| | |
|---|---|
| G06F 16/00 | (2019.01) |
| G06F 16/23 | (2019.01) |
| G06F 16/2452 | (2019.01) |
| G06F 16/245 | (2019.01) |
| G06F 16/21 | (2019.01) |
| G06F 16/16 | (2019.01) |

(52) U.S. Cl.
CPC ........ *G06F 16/2365* (2019.01); *G06F 16/164* (2019.01); *G06F 16/217* (2019.01); *G06F 16/245* (2019.01); *G06F 16/24522* (2019.01)

(58) Field of Classification Search
CPC ......... G06F 17/30427; G06F 17/30424; G06F 17/3043; G06F 16/2365; G06F 16/164

USPC .................................................. 707/760, 769
See application file for complete search history.

(56) References Cited

U.S. PATENT DOCUMENTS

| | | | | |
|---|---|---|---|---|
| 2003/0055826 | A1* | 3/2003 | Graham | G06F 17/3056 |
| 2012/0005190 | A1* | 1/2012 | Faerber | G06F 17/30404 |
| | | | | 707/718 |
| 2013/0166490 | A1* | 6/2013 | Elkins | G06N 5/022 |
| | | | | 706/47 |
| 2014/0344193 | A1* | 11/2014 | Bilenko | G06N 20/00 |
| | | | | 706/12 |
| 2015/0253749 | A1* | 9/2015 | Kniazev | G05B 13/048 |
| | | | | 700/29 |

OTHER PUBLICATIONS

U.S. Appl. No. 15/186,877, filed Jun. 20, 2016.
U.S. Appl. No. 15/139,672, filed Apr. 27, 2016.
U.S. Appl. No. 15/067,643, filed Mar. 11, 2016.
U.S. Appl. No. 14/826,750, filed Aug. 14, 2015.
U.S. Appl. No. 14/666,918, filed Mar. 23, 2015.
List of Patents or Applications Treated as Related.
Vladimir S. Rastunkov et al., U.S. Appl. No. 15/067,643, filed Mar. 11, 2016, entitled Auto Query Construction for In-Database Predictive Analytics.

* cited by examiner

*Primary Examiner* — Thu Nguyet T Le
(74) *Attorney, Agent, or Firm* — McGuireWoods LLP

(57) ABSTRACT

A system, method, and computer-readable medium for performing a distributed analytics operation. The distributed analytics operation uses interface technologies to de-couple an actual data storage technology from an implementation of distributed analytics. Such a distributed analytics operation obviates requirements to deploy specific computer code onto a data storage platform to specifically target that platform for distributed predictive analytics computations.

18 Claims, 5 Drawing Sheets

US 10,649,973 B2

METHOD FOR PERFORMING IN-DATABASE DISTRIBUTED ADVANCED PREDICTIVE ANALYTICS MODELING VIA COMMON QUERIES

BACKGROUND OF THE INVENTION

Field of the Invention

The present invention relates to information handling systems. More specifically, embodiments of the invention relate to a system, method, and computer-readable medium for performing a distributed analytics operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to collect and store large amounts of data. Many technologies are being developed to process large data sets (often referred to as "big data", and defined as an amount of data that is larger than what can be copied in its entirety from the storage location to another computing device for processing within time limits acceptable for timely operation of an application using the data).

In-database predictive analytics have become increasingly relevant and important to address big-data analytic problems. When the amount of data that need be processed to perform the computations required to fit a predictive model become so large that it is too time-consuming to move the data to the analytic processor or server, then the computations must be moved to the data, i.e., to the data storage server and database. Because modern big-data storage platforms typically store data across distributed nodes, the computations often must be distributed also. I.e., the computations often need be implemented in a manner that data-processing intensive computations are performed on the data at each node, so that data need not be moved to a separate computational engine or node. For example the Hadoop distributed storage framework includes well-known map-reduce implementations of many simple computational algorithms (e.g., for computing sums or other aggregate statistics).

However, to perform more complex computations in this manner (via map-reduce computations), as are often necessary in the context of predictive analytics, it is usually necessary to develop specific software that is deployed to a respective data storage platform (e.g., database) where the data are stored and the computations are to be performed. For example, to perform distributed in-database computations in a Hadoop distributed storage framework, specific code needs to be developed (e.g., in a Java programming language) to implement the specific algorithms. This code is specific to in-database computations in a Hadoop distributed storage framework and cannot be easily applied to other popular database platforms, such as Teradata, SQL Server, Oracle and others.

SUMMARY OF THE INVENTION

A system, method, and computer-readable medium are disclosed for providing a distributed analytics operation. The distributed analytics operation uses interface technologies to de-couple an actual data storage technology from an implementation of distributed analytics. Such a distributed analytics operation obviates requirements to deploy specific computer code onto a data storage platform to specifically target that platform for distributed predictive analytics computations. More specifically, in certain embodiments, predictive modeling algorithms that rely entirely on database queries are integrated within a database to compute aggregations in-database. In certain embodiments, the predictive modeling algorithms are data-processing intensive algorithms (i.e., algorithms which when executed generate a user noticeable lag between the start and completion of execution). Examples of data-processing intensive algorithms include algorithms which often require complex transformations of data such as distribution functions, matrix operations, approximations of derivatives, convergence criteria and other mathematical operations. Accordingly, data-processing intensive algorithms often involve many computational steps. Such an integration enables predictive analytics operations to be efficiently executed external to the database so that the predictive analytics operations are simplified and more efficiently executed. The general philosophy embodied in this disclosure is that the predictive analytics operations are performed on aggregates-computed-from big-data, rather than performing analytics-on-big-data. Thus, the actual raw data never need be moved from a storage system to a computation system, and all required computations of aggregates are performed in-database. Only a much smaller volume of aggregate values (e.g., sums and sums of squared values) are transferred from the storage system to the computation system to finalize the parameters for predictive models.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
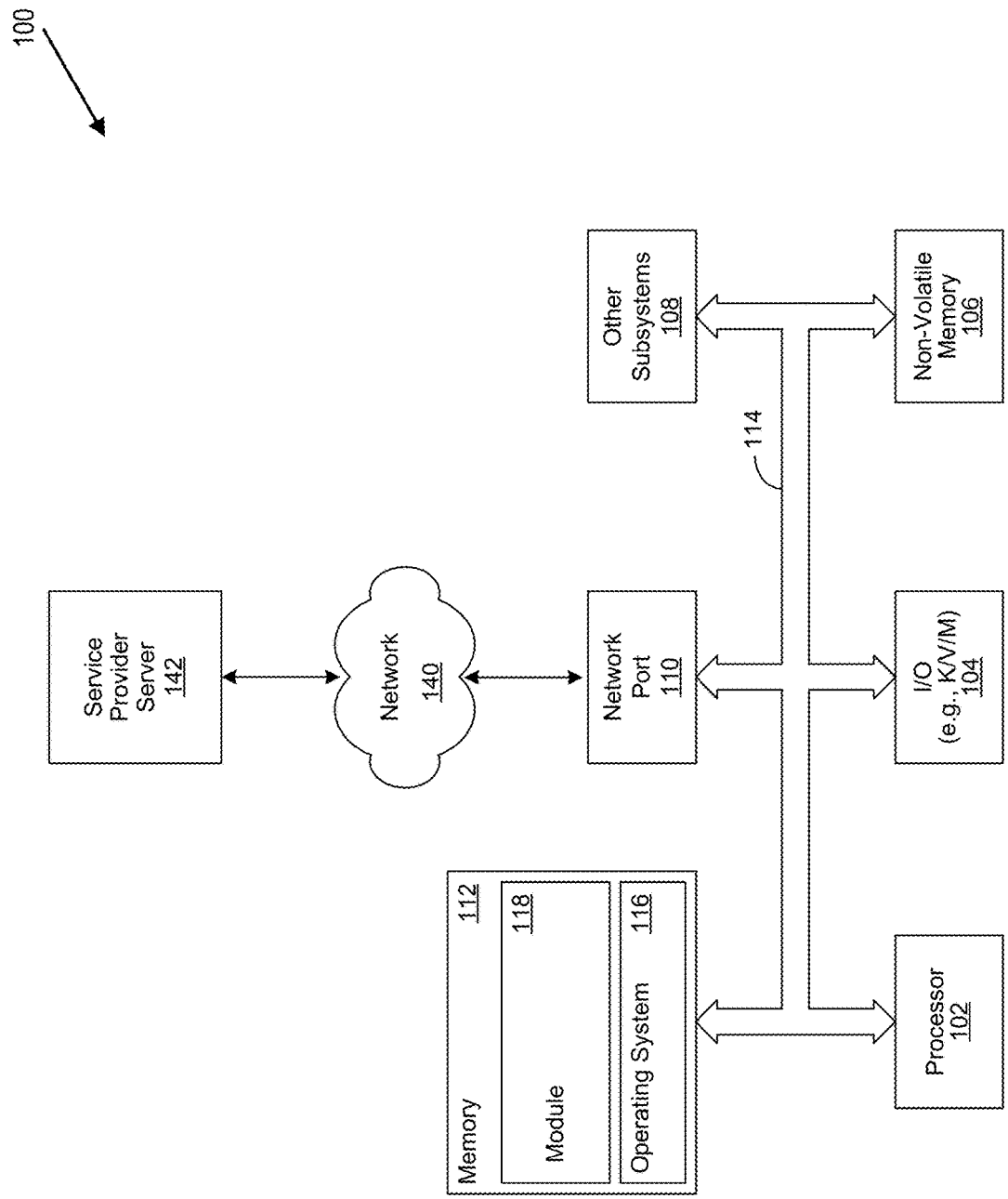
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a distributed analytics module 118.

Figure 2:
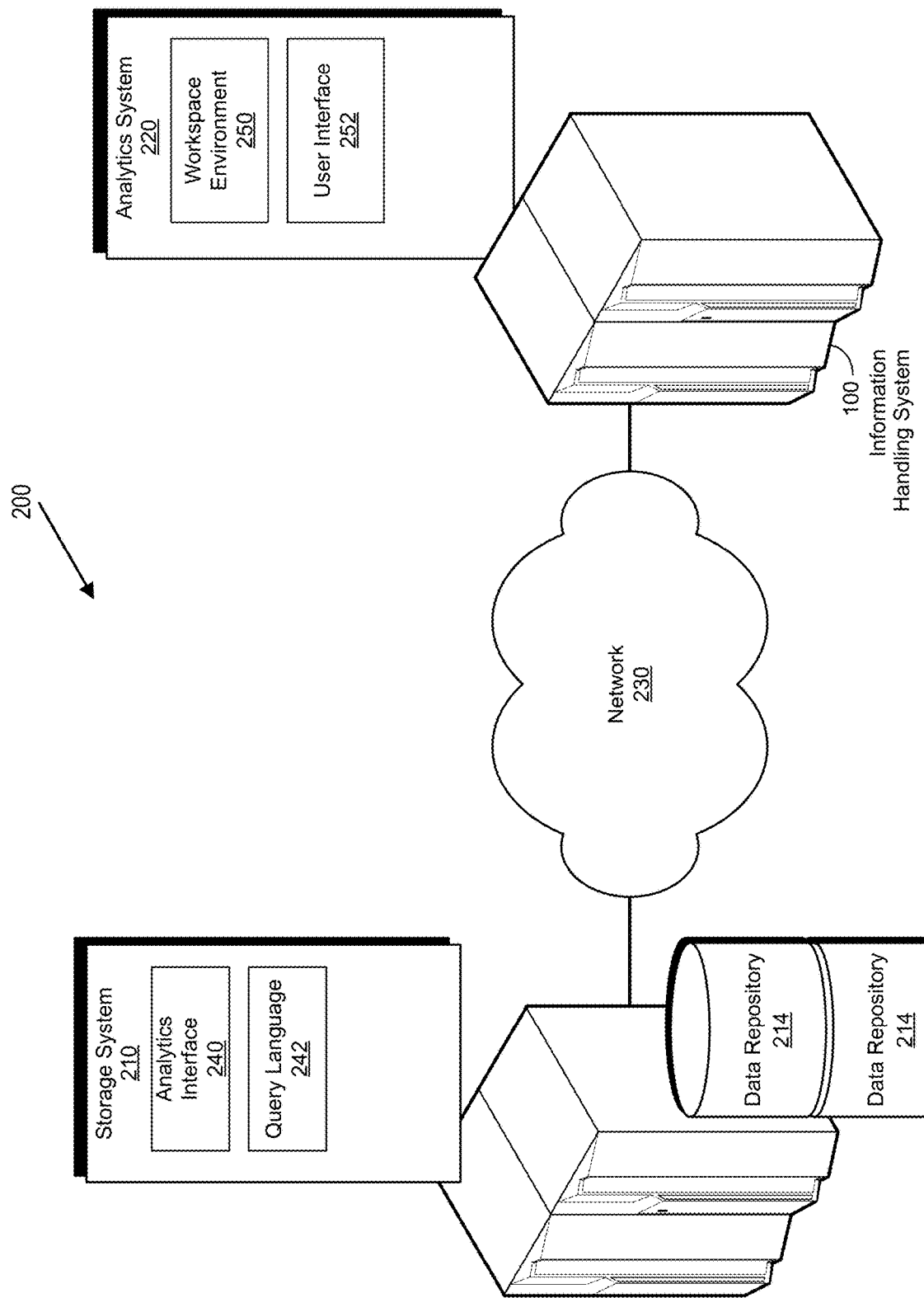
FIG. 2 shows a block diagram of an environment for virtualizing data processing for analytics and scoring.

FIG. 2 shows a simplified block diagram of a distributed analytics environment 200 in accordance with an embodiment of the invention. More specifically, the distributed analytics environment 200 includes a storage system 210 which includes one or more data repositories 214. The distributed analytics environment 200 further includes an analytics system 220 which is coupled with the storage system 210 via a network 230, which may be a private network, a public network, a local or wide area network, the Internet, combinations of the same, or the like. In various embodiments, the network 140 is included within the network 208. Either or both the storage system 210 and the analytics system 220 may reside within and execute on an information handling system 100. Portions of the storage system 210 as well as the analytics system 220 provide a distributed analytics system. Some or all of the functions of the distributed analytics system may be performed via the distributed analytics module 118.

The storage system 210 is configured to perform distributed computations to derive suitable aggregate summary statistics, such as summations, multiplications, and derivation of new variables via formulae. In various embodiments, the storage system 210 comprises a SQL Server, an Oracle type storage system, a Hive type storage system and/or a Teradata Server. It will be appreciated that other database platforms and systems are within the scope of the invention. It will also be appreciated that the storage system can comprise a plurality of databases which may or may not be the same type of database.

The storage system 220 includes an analytics interface 240. The storage system 210 executes a query language 242. The query language 242 enables the storage system 210 to initiate and control the execution of the distributed summary computations and aggregations in-database. In certain embodiments, the query language 242 is included within the analytics interface 240. In various embodiments, the query language 242 is defined by the type of storage system used and typically corresponds to one of the dialects of the SQL.

The analytics system 220 performs statistical and mathematical computations. In certain embodiments, the analytics system 220 comprises a Statistica Analytics System available from Dell, Inc. The analytics system 220 comprises a workspace environment 250 and user interfaces 252 for combining aggregate statistics and numerical summaries computed by the Storage System 210. The analytics system 220 further performs mathematical and statistical computations to derive final predictive models. In certain embodiments, Statistica Data Miner Workspace environment available from Dell, Inc. and the Graphical User Interface of the Statistica Data Miner Workspace are examples of the workspace environment 250 and user interfaces 252, respectively.

The workspace environment 250 provides summaries and aggregates which are computed via common queries, executed through the storage system 210, and executed via distributed query execution enabled through the capabilities of the storage system 210. For some algorithms, the execution performed on the Storage System 210 is initiated via derived variables defined through queries (e.g., coded design matrices), sums, sums of squared values, sums of squared cross-products of values, weights, numbers of observations, and other aggregate values. Additionally, in certain embodiments, the results of the execution performed on the storage system 210 are then further processed by the workspace environment 250 on the analytics system 220 to compute predictive models via multiple linear regression, general linear models, general logistic regression models, principal components analysis, cluster analyses, recursive partitioning (tree) models, and others.

Additionally, in certain embodiments, the execution performed on the storage system 210 includes performing certain computations and then creating subsamples of the results of the execution on the storage system 210. These subsamples are accessed by the workspace environment via queries subsamples of all data. The analytics system 220 can then operate on subsamples to compute (iteratively, e.g., over consecutive samples) final predictive models. Additionally, in certain embodiments, the subsamples are further processed by the workspace environment 250 on the analytics system 220 to compute predictive models including recursive partitioning models (trees, boosted trees, random forests), support vector machines, neural networks, and others.

In this process, consecutive samples may be random samples extracted at the storage system 210, or samples of consecutive observations returned by queries executing in the storage system 210. The analytics system 220 computes and refines desired coefficients for predictive models from consecutively returned samples, until the computations of consecutive samples no longer lead to modifications of those coefficients. In this manner, not all data in the storage system 210 ever needs to be processed.

The user interface 252 of the analytics system 220 provides user interface options to parameterize and optimize the computations. For example, in certain embodiments options are provided to enable simple computations on small samples extracted from the storage system 210, to derive best initial parameter estimates for any of the prediction models. The SQL query-based operation is then used to refine and finalize the model parameters.

Accordingly, the distributed analytics environment 200 enables in-database distributed analytics to be performed in a platform-agnostic fashion. Regardless of the actual data storage system, the analytics system 220 is able to leverage all capabilities of the Storage System for distributed processing, to perform the data-processing-intensive operations of computing aggregates or samples.

The distributed analytics environment 200 is implemented, without requiring deployment of storage system specific agents or computer code, against many different data storage systems, including all standard databases, Hadoop type storage systems or Spark via Hive (and HiveQL), or to emerging appliances such as Microsoft APS. The analytics system 220 and workspace environment 250 are agnostic with respect to the actual storage systems in use, and hence capable of supporting hybrid environments. Such a distributed analytics system would be much easier to deploy, maintain, and scale.

In various embodiments, the network 230 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Figure 3:
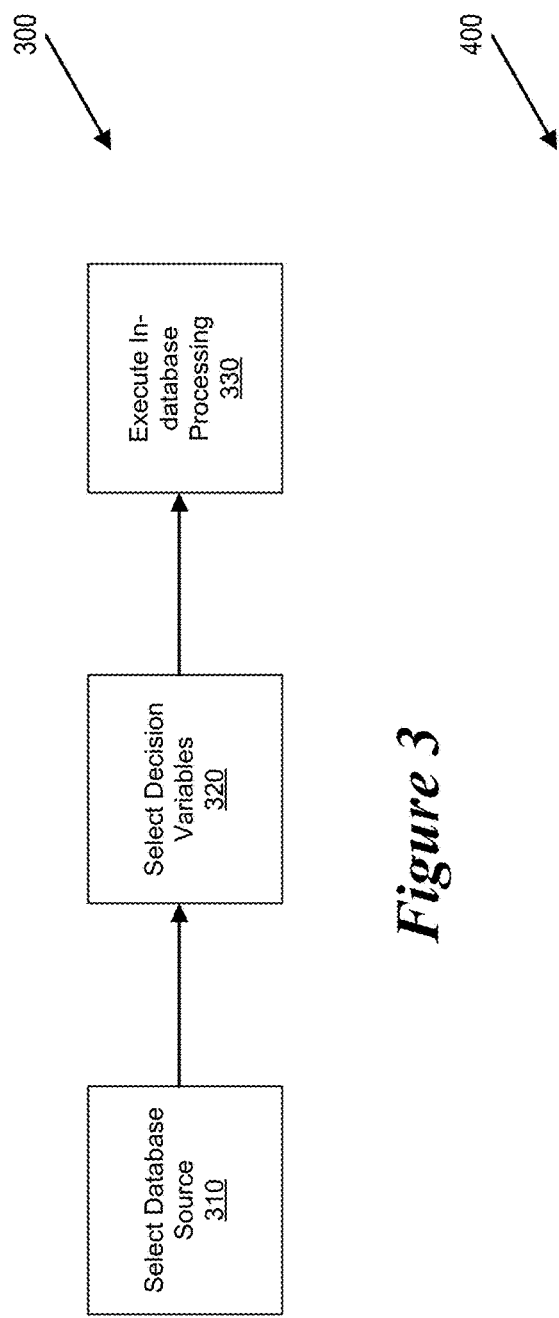
FIG. 3 shows a flow diagram of an end-user perspective of in-database processing operation.

FIG. 3 shows a flow diagram of an end-user perspective of in-database processing operation. More specifically, when performing an in-database processing operation 300, the user selects a database source at step 310. The database source can be any compliant database. For the purposes of the present disclosure, a compliant database comprises a database which has corresponds to the open database connectivity (ODBC) or open link and embedding database (OLE DB) database standards with SQL dialect or a database which supports a functionally comparative formal query language allowing the database to perform distributed computations. Examples of compliant databases include the Microsoft SQL Server database, Microsoft SQL Server Parallel Distributed Warehouse (PDW) database, Oracle database, Teradata database, Apache Hive database, MySQL database, and IBM Netezza database.

Next, the user selects decision variables at step 320. When selecting the decision variables, a database table description is acquired, e.g., via the workspace environment 252 of the analytics system 220.

Next, at step 330, the in-database processing is executed by the storage system 210. When executing the in-database processing, only the final results of the execution are extracted by the analytics system 220.

The in-database processing operation empowers analysts with an in-database processing capabilities while only needing three steps to configure the processing. Additionally, by providing an in-database analysis user interface within the analytics system 220, the in-database processing capabilities can be configured with no knowledge or SQL programming or database configuration in general. Additionally, all of the performance intensive computations are executed on the database side of the environment, significantly reducing the amount of data that needs to be provided from the database to the analytics system 220.

Figure 4:
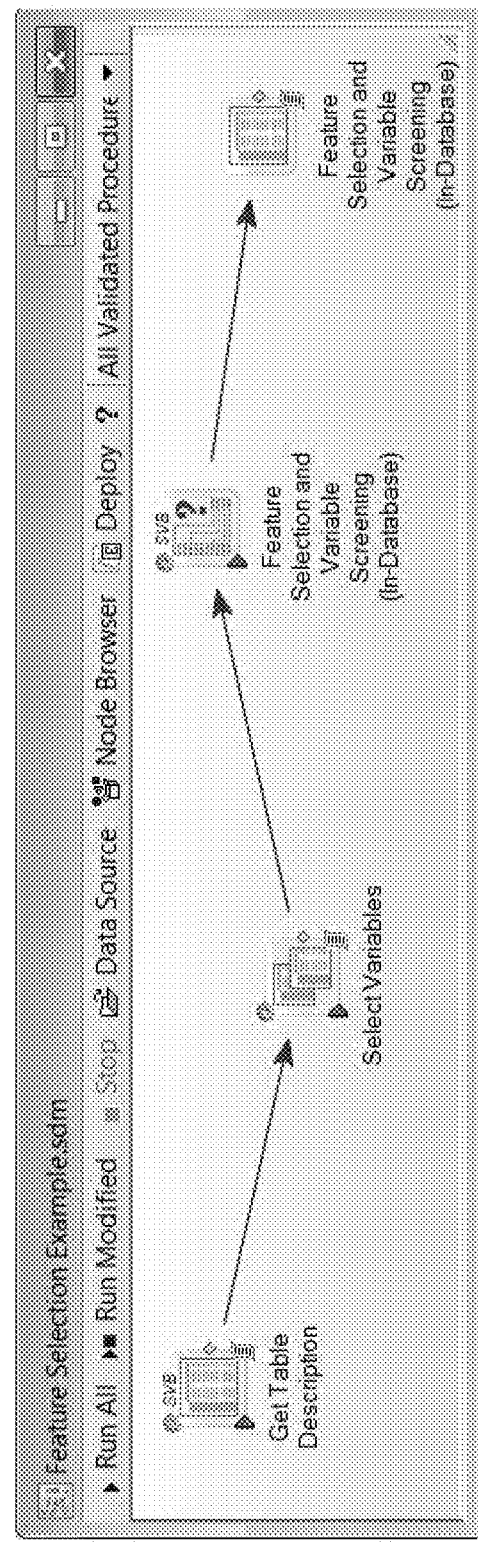
FIG. 4 shows a flow diagram of an implementation of an in-database processing operation.

FIG. 4 shows an example of a user interface 400 of an in-database processing operation. In certain embodiments, the example user interface 400 is generated via the user interface module 252 of the analytics system 220.

Figure 5:
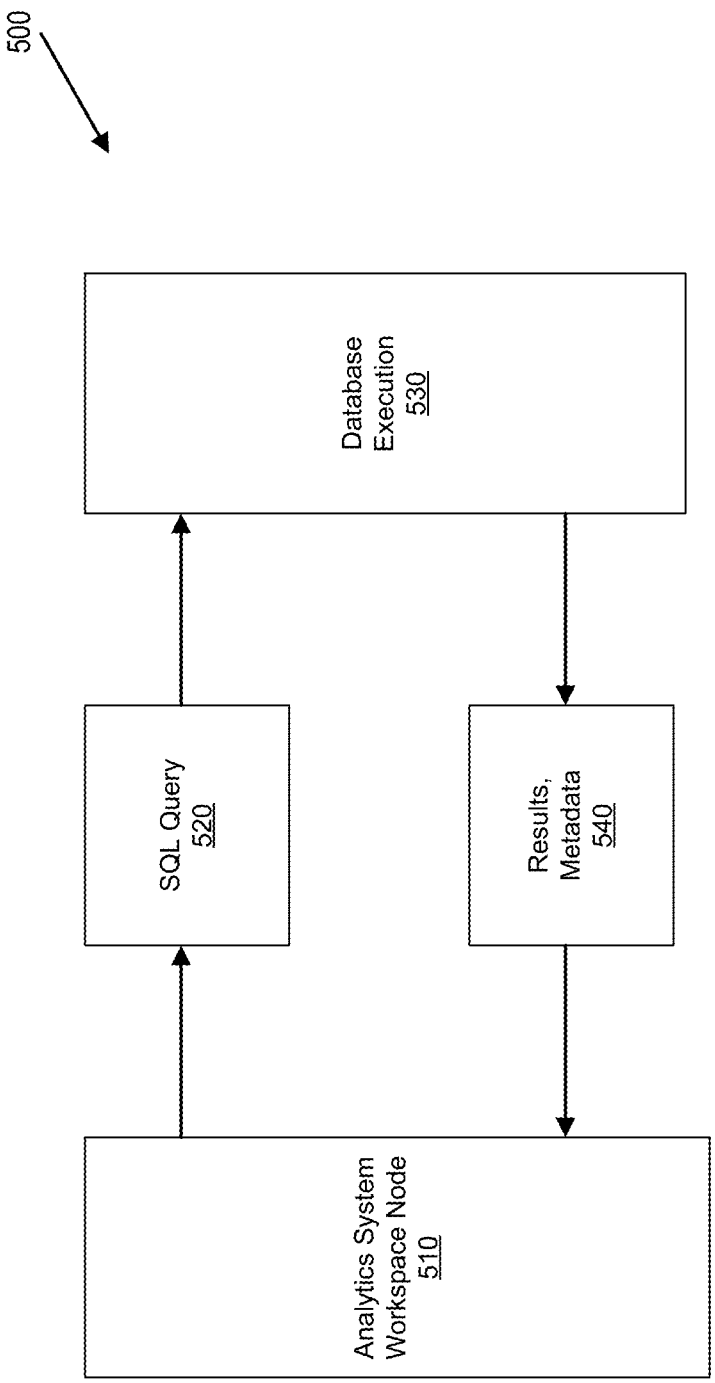
FIG. 5 shows a flow chart of an in-database processing operation.

FIG. 5 shows a flow diagram of an implementation of an in-database processing operation 500. More specifically, the in-database processing operation is instantiated within a node of the workspace environment 250 of the analytics system 220 at step 510. Next at step 520, the node of the workspace environment 250 converts the instantiation of the in-database processing operation to a SQL statement (or set of statements). Next, at step 530, the SQL statement is provided to the storage system 210 (e.g., a database) where the storage system 210 distributes and executes the SQL statement. Next at step 540, the results and/or metadata from the execution of the SQL statement (or set of statements) is provide to the node of the workspace environment 250.

With the implementation of an in-database processing operation 500, all of the steps of the analytic algorithms involving iterations through the raw data are performed within the database with only the results or metadata being extracted back to the analytics system in one or multiple iterations. Additionally, in various embodiments, the node of the workspace environment 250 which represents the instantiation of the in-database processing operation include one or more of a feature selection module, a multiple regression module, a correlations module and/or a logistic regression module.

Figure 6:
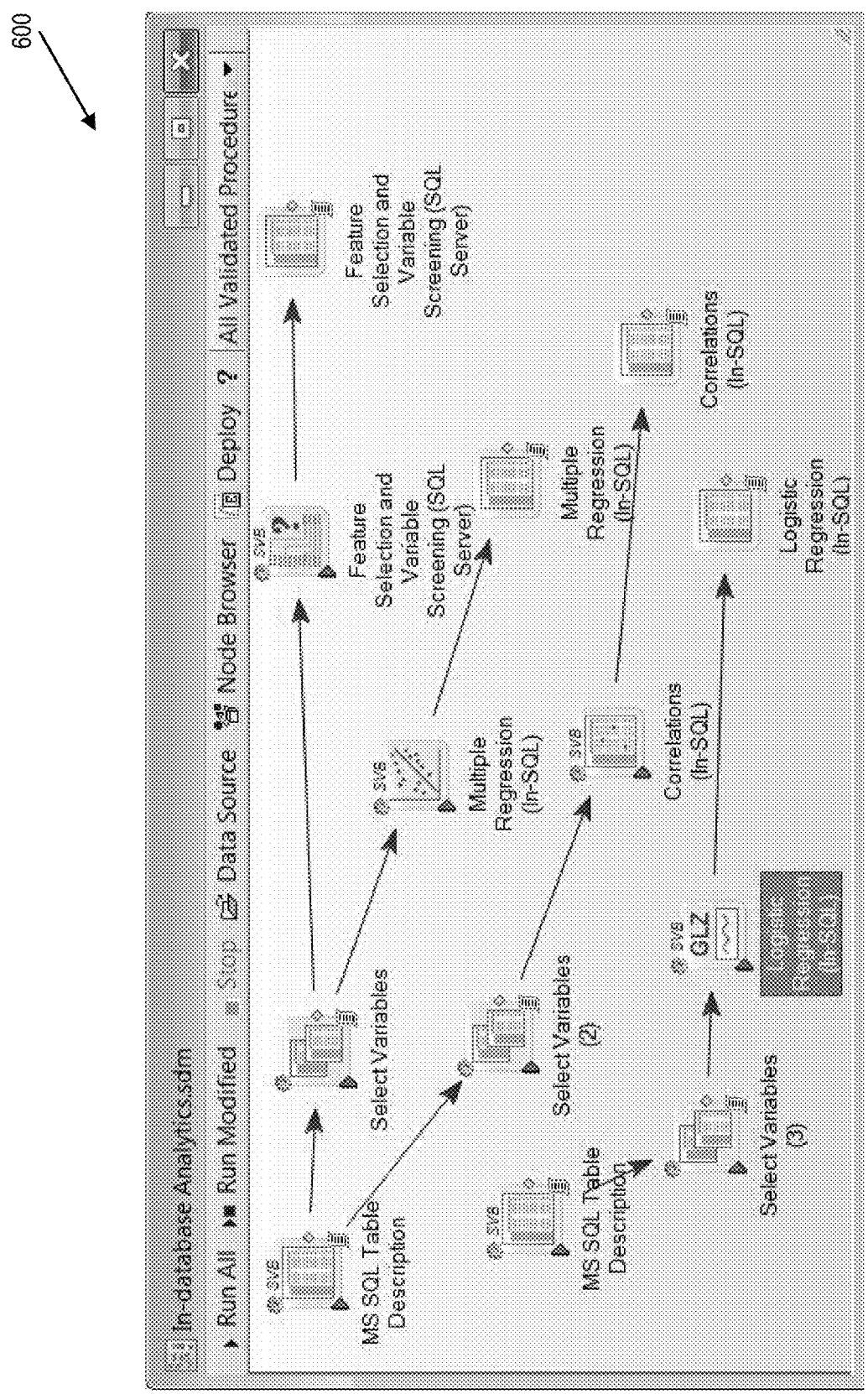
FIG. 6 shows an example of a user interface of an implementation representation of an in-database processing operation.

FIG. 6 shows an example of a user interface 600 of an implementation representation of an in-database processing operation. In certain embodiments, the example user interface 600 is generated via the user interface module 252 of the analytics system 220.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing in-database processing operations, comprising:
    generating an in-database processing operation according to user-selected decision variables and a database source description table;
    instantiating the in-database processing operation within a node of a workspace environment, the node of the workspace environment being located away from a storage system and having a user interface for communicating with a user, the in-database processing operation comprising a storage system-agnostic operation performable without deployment of a storage system-specific agent;
    converting, at the node of the workspace environment, the instantiation of the in-database processing operation to at least one SQL statement;
    providing the at least one SQL statement to the storage system, wherein the at least one SQL statement is executed in-database within the storage system, and wherein the storage system executes a query language for initiating and controlling the in-database execution of the at least SQL statement;
    receiving, at the node of the workspace environment, results from the in-database execution of the at least one SQL statement, wherein the results comprise aggregate values; and
    performing, at the node of the workspace environment, mathematical and statistical computations for a predictive analytics modeling operation, the mathematical and statistical computations selected from a plurality of predictive analytics model operation using the aggregate values.

2. The method of claim 1, wherein the at least one SQL statement is distributed across a plurality of nodes of the storage system, and wherein the at least one SQL statement is executed in-database at each of the plurality of nodes of the storage system.

3. The method of claim 1, wherein the predictive modeling operation relies on queries to the storage system.

4. The method of claim 3, wherein the predictive modeling operation comprises data-processing intensive operations.

5. The method of claim 1, wherein the node of the workspace environment determines parameters for predictive models based upon the aggregate values.

6. The method of claim 1, wherein the node of the workspace environment determines parameters for predictive models based upon the aggregate values.

7. The method of claim 1, wherein the node comprises a feature selection module, a multiple regression module, a correlations module, and a logistic regression module.

8. The method of claim 1, wherein subsamples of results of the in-database execution of the at least one SQL statement are created at the storage system and are accessed by the node via queries, and wherein the method further comprises iteratively computing predictive models based on the results.

9. The method of claim 8, wherein the predictive models comprise a recursive partitioning model, a support vector machine, and a neural network.

9

10. The method of claim 8, wherein the subsamples comprise consecutive samples, and wherein the method further comprises computing coefficients for the predictive models.

11. The method of claim 10, further comprising refining the coefficients until the iterative computations no longer lead to modification of the coefficients.

12. The method of claim 11, further comprising providing a user interface to parameterize the iterative computations.

13. The method of claim 10, further comprising refining the coefficients until the iterative computations no longer lead to modification of the coefficients such that less than all data in the storage system is processed.

14. A system for performing in-database processing operations, the system comprising:
   a processor;
   a data bus coupled to the processor; and
   a memory comprising instructions executable by the processor and configured for:
   generating an in-database processing operation according to user-selected decision variables and a database source description table;
   instantiating the in-database processing operation within a node of a workspace environment, the node of the workspace environment being located away from a storage system and having a user interface for communicating with a user, the in-database processing operation comprising a storage system-agnostic operation performable without deployment of a storage system-specific agent;
   converting, at the node of the workspace environment, the instantiation of the in-database processing operation to at least one SQL statement;
   providing the at least one SQL statement to the storage system, wherein the at least one SQL statement is executed in-database within the storage system, and wherein the storage system executes a query language for initiating and controlling the in-database execution of the at least SQL statement;
   receiving, at the node of the workspace environment, results from the in-database execution of the at least one SQL statement, wherein the results comprise aggregate values; and
   performing, at the node of the workspace environment, mathematical and statistical computations for a predictive analytics modeling operation, the mathematical

10 and statistical computations selected from a plurality of predictive analytics model operations using the aggregate values.

15. The system of claim 14, wherein the at least one SQL statement is distributed across a plurality of nodes of the storage system, and wherein the at least one SQL statement is executed in-database at each of the plurality of nodes of the storage system.

16. The system of claim 14, wherein the predictive modeling operation relies on queries to the storage system.

17. The system of claim 16, wherein the predictive modeling operation comprises data-processing intensive operations.

18. A non-transitory, computer-readable storage medium embodying computer program code, the computer program code comprising computer executable instructions configured for:
   generating an in-database processing operation according to user-selected decision variables and a database source description table;
   instantiating the in-database processing operation within a node of a workspace environment, the node of the workspace environment being located away from a storage system and having a user interface for communicating with a user, the in-database processing operation comprising a storage system-agnostic operation performable without deployment of a storage system-specific agent;
   converting, at the node of the workspace environment, the instantiation of the in-database processing operation to at least one SQL statement;
   providing the at least one SQL statement to the storage system, wherein the at least one SQL statement is executed in-database within the storage system, and wherein the storage system executes a query language for initiating and controlling the In-database execution of the at least SQL statement;
   receiving, at the node of the workspace environment, results from the in-database execution of the at least one SQL statement, wherein the results comprise aggregate values; and
   performing, at the node of the workspace environment, mathematical and statistical computations for a predictive analytics modeling operation, the mathematical and statistical computations selected from a plurality of predictive analytics mod& operations using the aggregate values.

* * * * *